(12) United States Patent
Bang et al.

(10) Patent No.: US 7,204,501 B2
(45) Date of Patent: Apr. 17, 2007

(54) UNIVERSAL STOWABLE STEP

(76) Inventors: Gary Bang, 4785 Oleander Dr., Chandler, AZ (US) 85248-5466; Dan Knodle, 2543 First Ave. North, Seattle, WA (US) 98109

( * ) Notice: Subject to any disclaimer, the term of this patent is extended or adjusted under 35 U.S.C. 154(b) by 184 days.

(21) Appl. No.: 11/056,214

(22) Filed: Feb. 10, 2005

(65) Prior Publication Data

US 2005/0146112 A1 Jul. 7, 2005

Related U.S. Application Data

(63) Continuation-in-part of application No. 10/289,887, filed on Nov. 7, 2002, now Pat. No. 6,935,647, which is a continuation-in-part of application No. 09/802,286, filed on Mar. 8, 2001, now Pat. No. 6,659,484.

(51) Int. Cl.
*B60R 3/02* (2006.01)
(52) U.S. Cl. .................. 280/166; 280/164.1; 248/131
(58) Field of Classification Search ............ 280/163, 280/164.1, 164.2, 166, 169; 182/89, 91, 182/127; 248/131; 224/519–521
See application file for complete search history.

(56) References Cited

U.S. PATENT DOCUMENTS

| 2,001,802 | A |  | 5/1935 | Spettel |
| 3,266,594 | A |  | 8/1966 | Antosh et al. |
| 3,580,613 | A |  | 5/1971 | Northrop |
| 3,827,626 | A |  | 8/1974 | Daigle |
| 4,312,515 | A |  | 1/1982 | Allori |
| 4,524,475 | A |  | 6/1985 | Valentino |
| 5,697,588 | A |  | 12/1997 | Gonzalez |
| 5,738,362 | A |  | 4/1998 | Ludwick |
| 5,897,125 | A |  | 4/1999 | Bundy |
| 6,149,172 | A |  | 11/2000 | Pascoe |
| 6,511,086 | B2 | * | 1/2003 | Schlicht ................ 280/166 |
| 6,685,204 | B1 | * | 2/2004 | Hehr ..................... 280/166 |

* cited by examiner

*Primary Examiner*—Christopher P. Ellis
*Assistant Examiner*—Brian Swenson
(74) *Attorney, Agent, or Firm*—Jensen & Puntigam PS

(57) ABSTRACT

A universal retractable step for use with the trailer hitch receptacle on automotive vehicles, wherein the step is movable from a stowed position to a utility position while remaining in the same horizontal plane. The step is readily adaptable to fit different trailer hitch receptacle sizes, as well as vehicles of differing heights, while including items to improve stability and security.

4 Claims, 6 Drawing Sheets

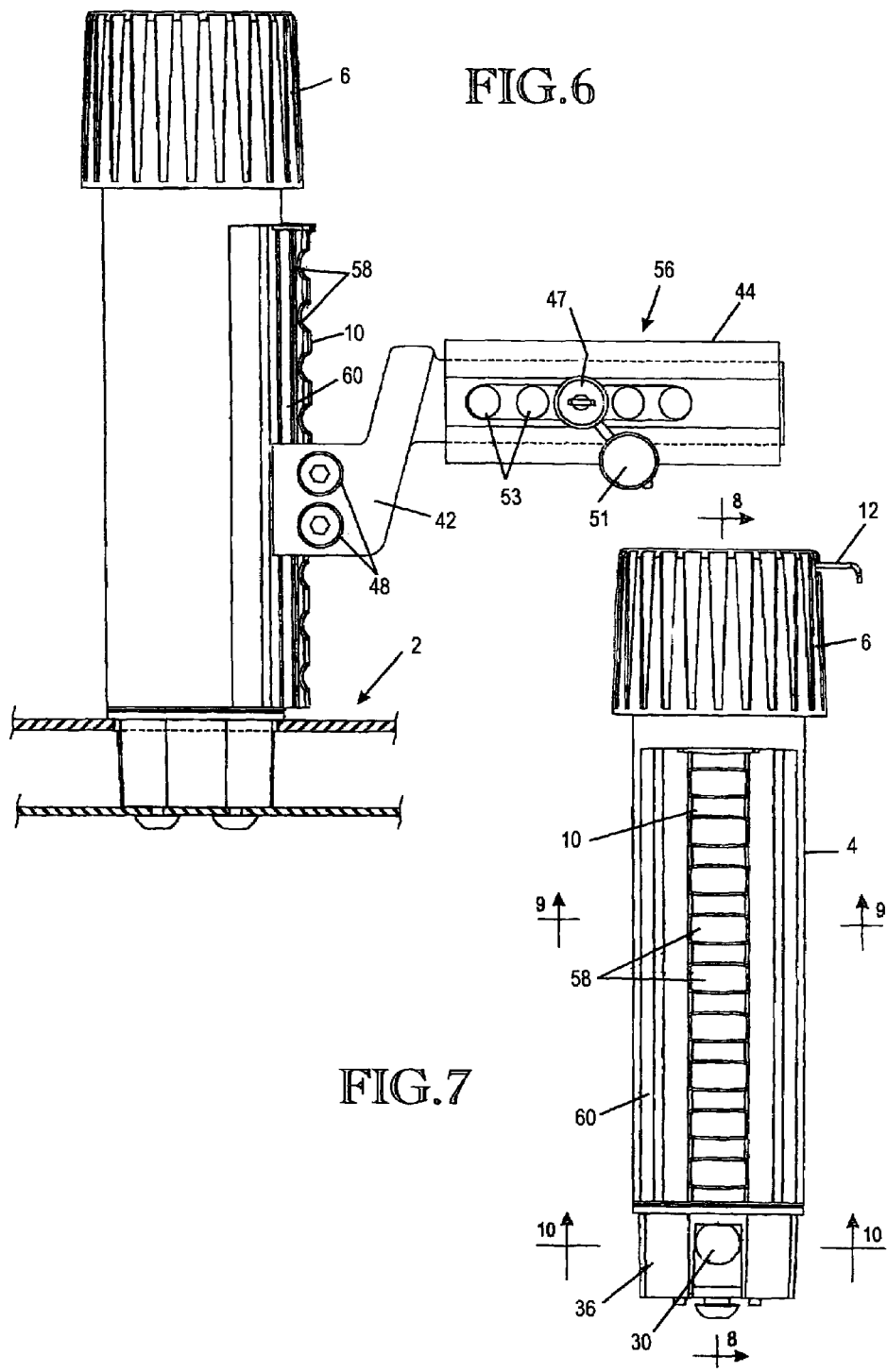

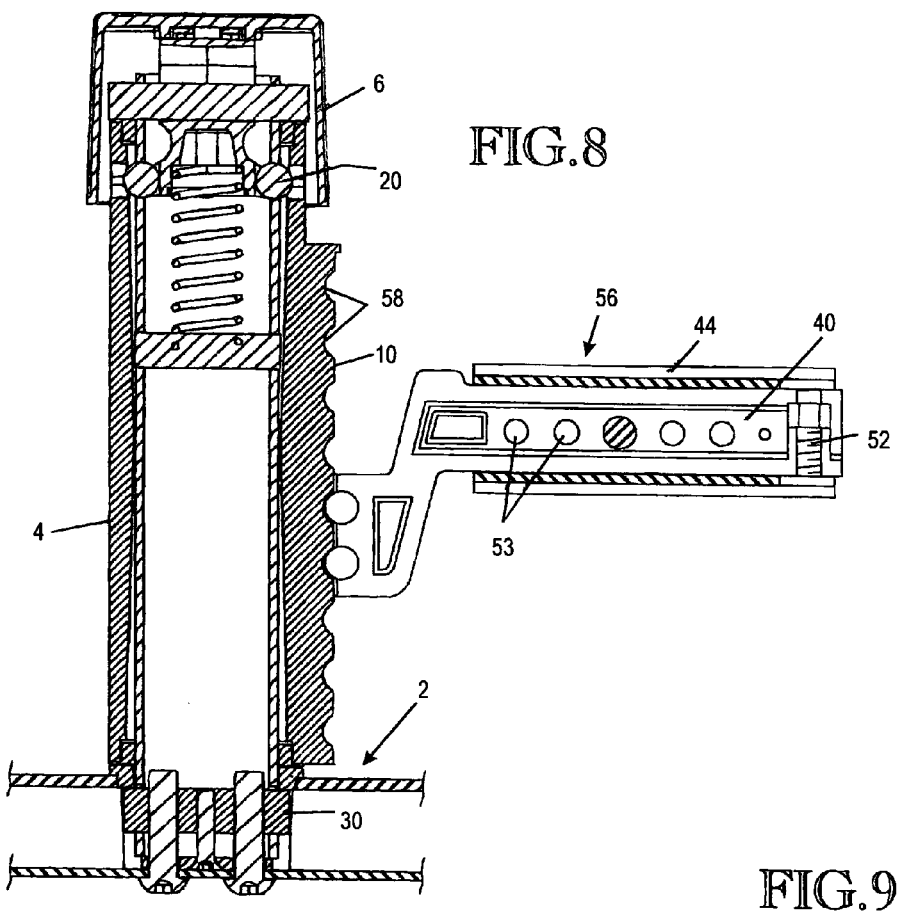
FIG. 8
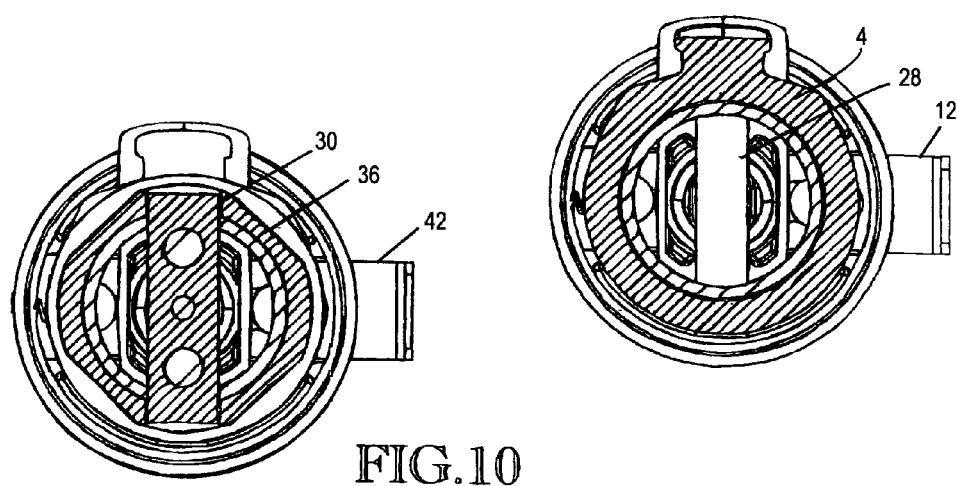
FIG. 9
FIG. 10

UNIVERSAL STOWABLE STEP

This application is a continuation-in-part of U.S. application Ser. No. 10/289,887, filed Nov. 7, 2002, now U.S. Pat. No. 6,935,647 which in turn is a continuation-in-part of U.S. patent application Ser. No. 09/802,286 filed Mar. 8, 2001. (U.S. Pat. No. 6,659,484). The above-noted disclosures are incorporated herein by reference.

TECHNICAL FIELD

The present invention is related to novel, improved vehicle-mountable steps having a platform that can be moved between the deployed (operative) and stowed positions without requiring vertical displacement.

Currently, devices embodying the principles of the present invention have a bracket that fits in the receiver (socket) of a conventional ball and socket type trailer hitch. The principles of the present invention will be developed primarily with reference to that application of the invention. It is to be understood that this is being done for the sake of brevity and clarity, and is not intended to limit the scope of the appended claims.

BACKGROUND OF THE INVENTION

Vehicles, such as many pickup trucks, vans, RVs, and SUVs, have cargo beds located at a considerable height above the ground level. This makes it difficult for many persons to climb into the vehicle and also difficult to lift many loads into the vehicle bed. For example, many persons have dogs which cannot jump into the truck or SUV bed, which can be 25–30 inches or more off the ground, and it can prove difficult to lift larger dogs (and other animals) to the necessary heights. Even some large dogs such as Golden Retrievers, German Shepherds, and Labrador Retrievers have some difficulty jumping into and out of these types of vehicles. Many smaller breeds can't get in or out at all. As animals age, they become increasingly susceptible to arthritis, and their hips and elbows in this aging process makes getting in and out of vehicles even more difficult.

Also, many activities involve putting on or taking off boots, waders or other articles of clothing. It is oftentimes difficult to put on or remove these items while sitting on a seat or the back bumper; consequently there is a need for a device which also provides a seat for persons engaged in the foregoing and other tasks.

Steps or platforms (and other devices) intended to solve this problem have been proposed.

A vehicle step which has the advantage that it can be rotated between operative and stowed positions so that items may be left on the vehicle while the vehicle is moving is disclosed in U.S. Pat. No. 5,738,362, issued Apr. 14, 1998. This step, however, has a drawback; the step itself, and associate structure, must be lifted and rotated to move it between the operative and stowed positions. This can be cumbersome if the step is large or heavy; furthermore, only a keeper held in place by gravity retains the step in the position to which it is rotated. In rough terrain the keeper may bounce upwardly and allow the step to rotate out of the intended position, possibly damaging the device and causing other problems. Further, this device would be awkward to operate with only one hand.

Other products which have been tried, but failed to meet the need addressed by the present invention, include, but are not necessarily limited to, the following:

Pet Step Ramp-this product is a plastic molded ramp that be set on the bumper of the vehicle to allow a dog to walk up or down, into or out of the back of the vehicle. There are several problems with this product, in that, first, it would need considerable room behind the vehicle to allow the product to be used, and this space could be difficult to find in many urban parking situations. A further problem is where to stow the ramp when it is not being used.

Hitch extender step-this product does not extend as far back as the Pet Step Ramp, but has the added problem of protruding beyond the bumper if left in place while driving. If it is removed or replaced, between uses, the issue of storage becomes significant. Another problem is that the step is higher than may be useful since it is on the same level as the receiver of the hitch to which the device is mounted.

Receiver/Hitch Stairs—This product has more problems in addition to the ones that make the hitch/extender step unsatisfactory. Perhaps the most serious drawback is that the top step interferes with the back hatch of most vehicles, requiring it to be removed between uses.

Hitch Step—This product does not have the storage problems of the products above, but it is too small to be used effectively for the desired uses, such as for sitting on, to put on or take off boots, or to be used as a step for most dogs, or to be used to place objects upon.

SUMMARY OF THE INVENTION

The present invention is similar in concept to the device disclosed in U.S. Pat. No. 6,659,484, yet the present invention has more universal application in that it is designed to fit and function well on most vehicles.

Because the invention is adjustable in height and in length, it can be modified on installation such that it fits a variety of vehicles.

The improvement in the locking mechanism assures that the platform is more stable in use.

BRIEF DESCRIPTION OF THE DRAWINGS

FIG. 6 is a side view of the present invention fully assembled with the securement device and the step.

FIG. 7 is a front view of the main assembly or control device of the present invention.

FIG. 8 is an elevational sectional view along lines 8—8 of FIG. 7.

FIG. 9 is a horizontal sectional view along lines 9—9 of FIG. 7.

FIG. 10 is a horizontal sectional view along lines 10—10 of FIG. 7.

BEST MODE FOR CARRYING OUT THE INVENTION

Figure 1:
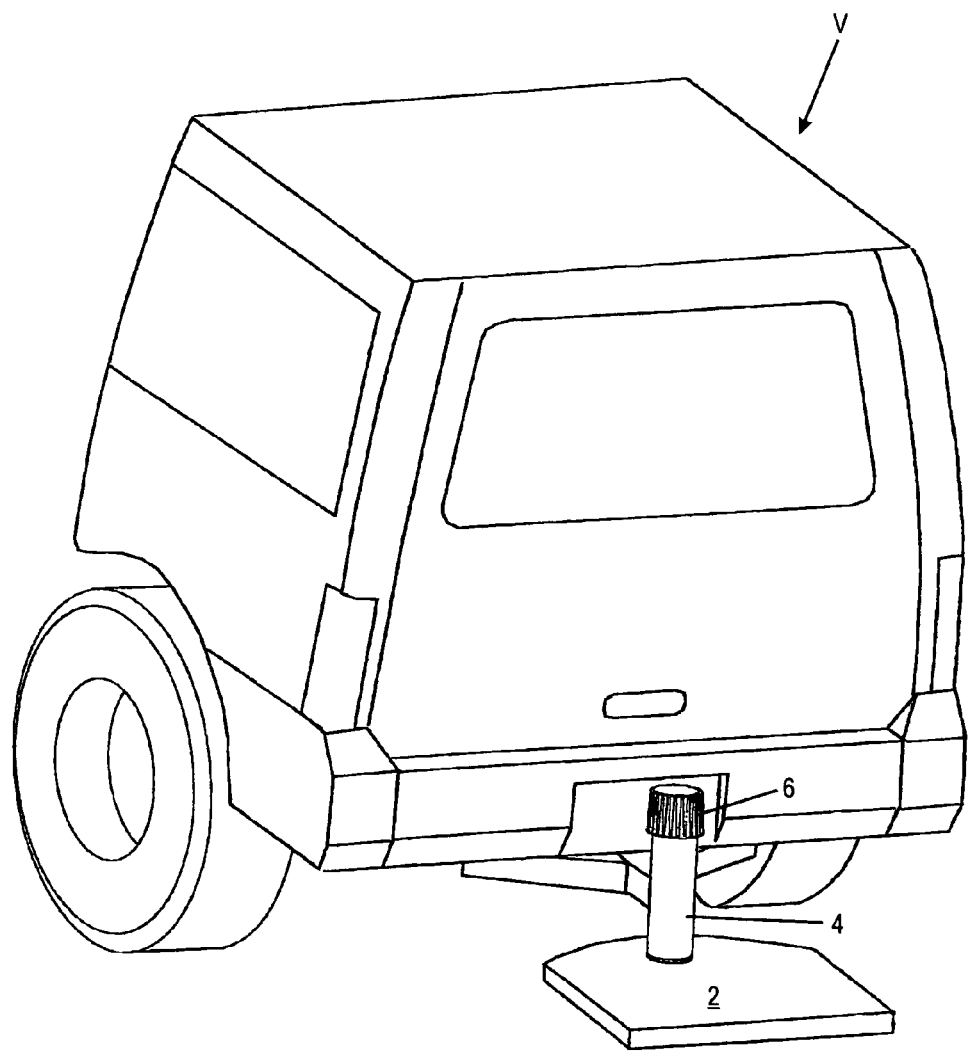
FIG. 1 is a perspective view displaying the inventive step at the rear of a vehicle.

As seen in FIG. 1, the present invention of a universal stowable step is shown secured to the rear end of a motor vehicle V and includes a step platform 2 secured to a vertical column 4 and including a control hand grip 6 which serves to both lock and control the position of the step 2 in either the stowed position beneath the vehicle or in the deployed position as shown, and as will be described in greater detail hereinafter.

Figure 2:
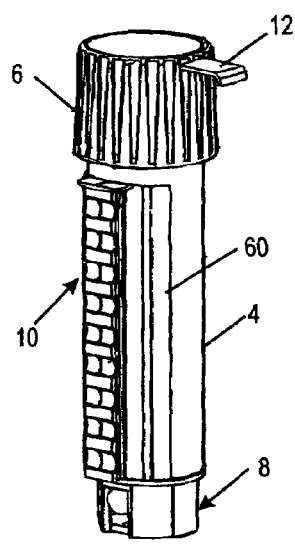
FIG. 2 is a view of the inventive control device without the normally attached step.

Reference is now had to FIG. 2, wherein the hand grip 6 is shown assembled relative to the exterior vertical column 4 as will be explained hereinafter, inner column 8 extends through the bottom of outer column 4 and supports and controls the position of the step or platform. Also seen in this view are a plurality of horizontal grooves 10, which as explained hereinafter, allow the step or platform 2 and attached assembly (see FIG. 3) to be located at different heights with relationship to the trailer hitch socket permitting the use on a variety of vehicles.

Figure 3:
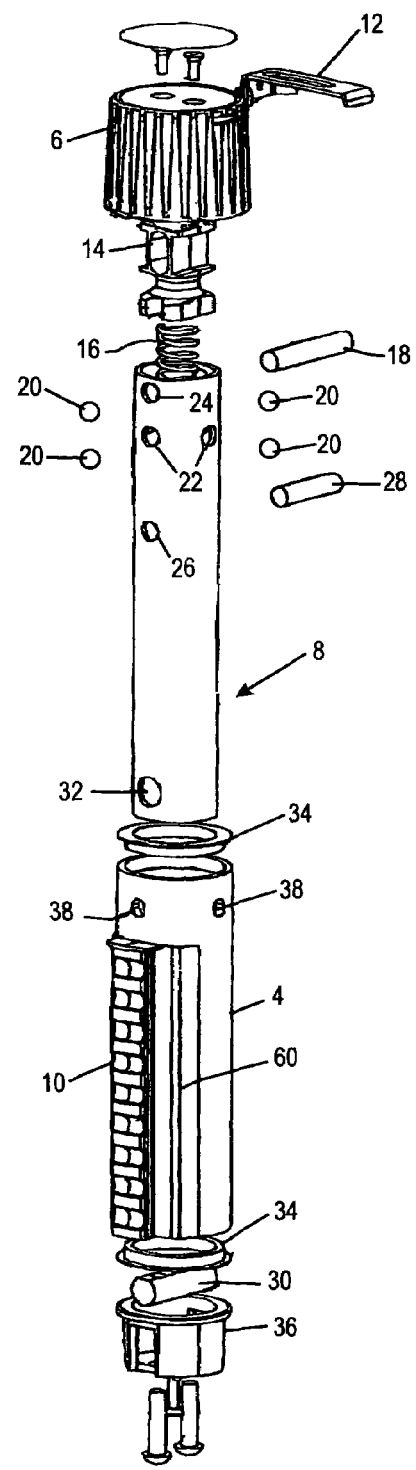
FIG. 3 is an exploded view of the device of FIG. 2.

Referring now to FIG. 3, there can be seen the latch assembly lever 12 which selectively permits vertical movement of hand grip 6. The rotational guide 14, the return spring 16, the inner column pivot pin 18, the locking balls 20, the inner column 8, including elongated openings 22 to receive the balls 20 when rotating the platform 2 and diametric openings 44 to receive pin 18 and 26 to receive spring support pin 28 all operate in conjunction to allow relative rotation of inner column 8 and attached platform 2 when hand grip 6 is depressed. Inner column 8 is telescopically received within outer column 4 and is axially locked in place by the interaction of base pin 30 interacting with horizontal bore 32 in inner column 8. Also seen in this view are nylon bearings 34 and inner column base 36, as well as locking bores 38. As explained in the current pending applications and patents, when it is desirable to lock the inner and outer columns to prevent rotation, balls 20 are allowed to roll radially outwardly into bores 38, preventing relative rotational motion between the two columns. As explainer hereinafter, bores 38 are elongated in the axial direction of column 4, generating a wedging condition stabilizing platform 2.

As explained in the co-pending applications, latch lever assembly 12 must be moved inwardly to permit downward movement of hand grip 6, thus preventing inadvertent release and rotation.

Figure 4:
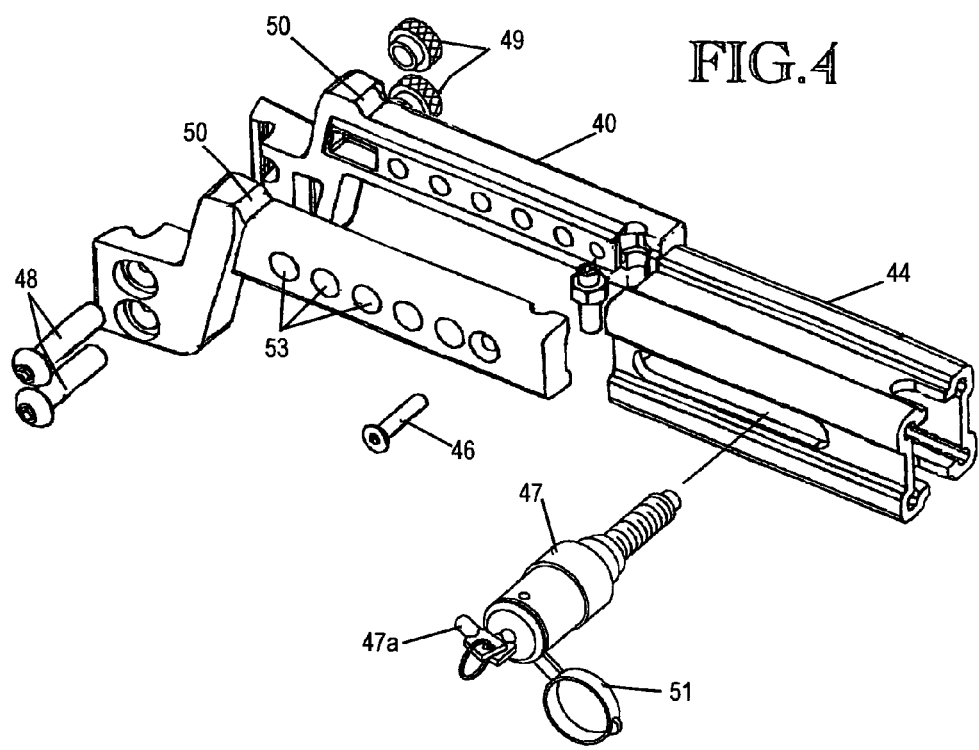
FIG. 4 is an exploded view of the universal attachment for securing the control device to a vehicle using the trailer hitch socket.
Figure 5:
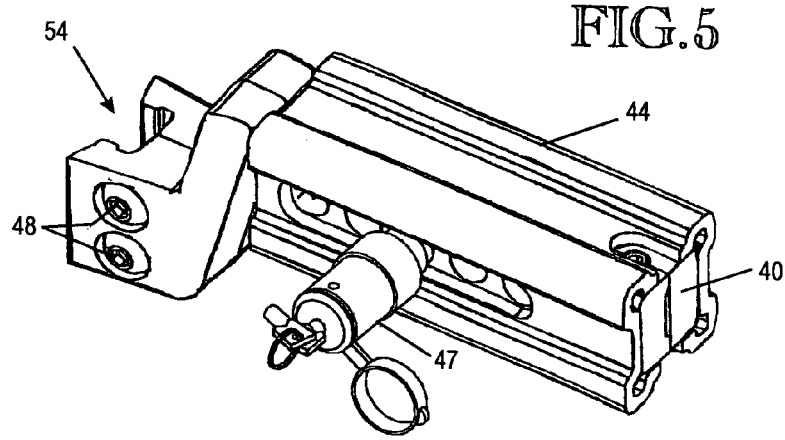
FIG. 5 is a view of the securement device in its shipping condition.

Reference is now had to FIGS. 4 and 5, wherein the means to secure the stowable steps and control mechanism is shown in FIG. 4 in exploded form and, as seen in this view, there is the split receiver, threaded side 40 and the clearance side 42, as well as the sleeve 44. When assembled, the split received is secured together by means of threaded element 46 passing through the forward end of clearance side 42 and interacting with the receiver threaded side 40, as well as the two threaded securing pins 48 at the trailing end secured by threaded elements 49. Locking bolt 47, including keys 49 and cover 51, serves to secure the receiver bar to the receiver tube assuring stability of the platform and preventing horizontal movement of the bar and/or sleeve, as well as preventing unauthorized removal of the unit. Vertical adjustment screw 52 serves to vertically stabilize the receiver bar within the receiver tube and thus stabilize the entire platform structure. The utilization or removal of sleeve 44 allows the device to be used in different size trailer hitch receivers, and the plurality of through openings 53 in the receiver allows the stowable steps to be located at varying distances from the end of the receiver, greatly increasing the versatility. Also to be noted in this view, and explained in greater detail hereinafter, is the open jaw configuration seen at the trailing end of FIG. 5 and designated in FIG. 5 as 54. As seen in FIGS. 6, 7 and 8, the trailing end of the split receiver/sleeve combination designated generally as 56 is adjustably interconnected with the vertical control portion having a forwardly projecting face 10 having a series of horizontal scallops 58, which interact with the horizontal securement pins 48. The opening jaw portion 54 interacts with vertical parallel grooves 60 to hold the element 56 in place. Once the appropriate height and interrelationship is determined, the though pins 48 and scallops 58 secure the entire device in position.

FIGS. 9 and 10, being horizontal sections of FIG. 7, clearly illustrate the interactions of the interior structures of the vertical control module.

Figure 11:
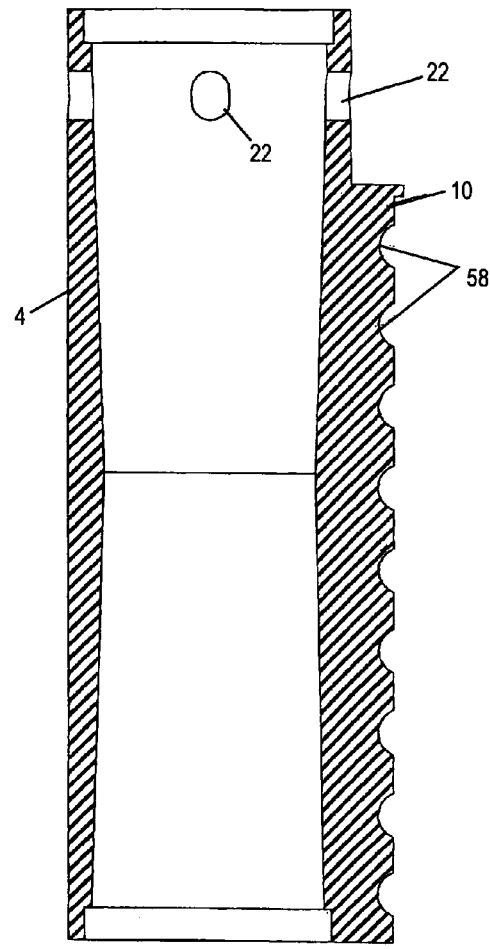
FIG. 11 is a vertical section through the exterior column of the present invention.
Figure 12:
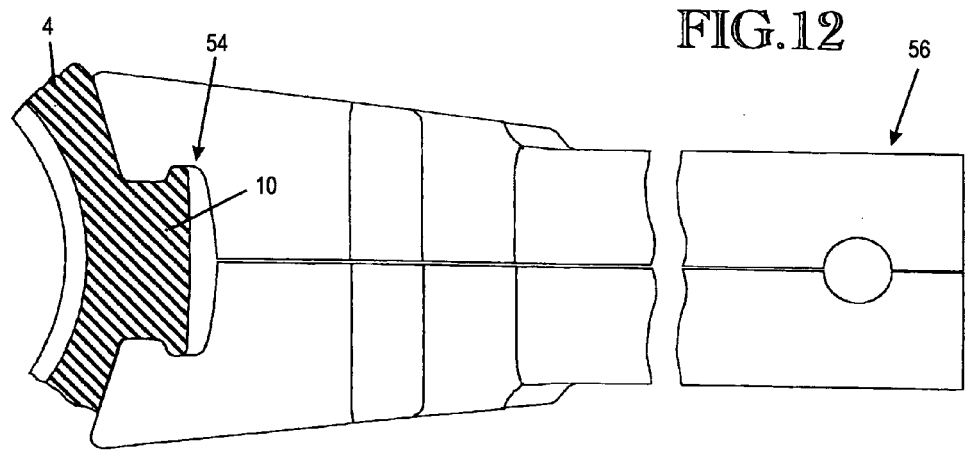
FIG. 12 is a horizontal section showing the interaction of the vertical column of FIG. 11 and the securement device of FIGS. 4 and 5.

FIGS. 11 and 12 more clearly show the vertical adjustability and locking mechanism between the step portion and the outer cylindrical portion 4. As seen in these two views, the vertical cylinder 4 has an outwardly projecting T-shaped element, which interacts with open jaw 54 to prevent outward movement of the step portion, and when the pins as noted in FIGS. 6, 7 and 8 interact with the scallops 58 of outwardly projecting portion 10, they act contra to the jaws 54, locking the device in place.

Thus, as can be seen, the present invention provides a universal step mechanism, which is secured to the rear end of a vehicle interacting with the trailer hitch receiver and can be adjusted both vertically and horizontally to accommodate various vehicles and best provide a step which is stowable beneath the floor of the vehicle and yet readily movable to a position extending outwardly, rearwardly thereof through the utilization of one hand and requiring no vertical displacement.

The invention claimed is:

1. A stowable step for use with a vehicle, having a trailer hitch receptacle, comprising:
   a horizontally adjustable securement means selectively received in the trailer hitch receptacle;
   a vertical sleeve means secured to and extending upwardly from the securement means, said sleeve means being vertically adjustable;
   control means co-axial with the sleeve means, telescopically and rotatably received within said sleeve means, said control means terminating at its lower end in a step means movable, while in a substantially constant horizontal plane, in conjunction with said control means, from a stowed position beneath the vehicle to a utility position extending outwardly from the vehicle, and at its upper end a control handle which allows single handed operation, including unlatching the control means allowing rotation thereof and rotating the control means and its attached step from the stowed to the utility position; and
   means to latch the step in its stowed and in its latched position.

2. A stowable step as in claim 1, and further including a locking pin preventing unauthorized removal of the stowable step while serving to further stabilize the stowable step.

3. A stowable step as in claim 1, wherein the horizontally adjustable securement means is also capable of mating with trailer hitch receptacles of differing sizes.

4. A stowable step as in claim 1, wherein the means to latch the step includes means to assure stability.

* * * * *